US011351959B2

(12) United States Patent
Yamamoto

(10) Patent No.: US 11,351,959 B2
(45) Date of Patent: Jun. 7, 2022

(54) VEHICLE SEATBELT DEVICE

(71) Applicant: Toyota Jidosha Kabushiki Kaisha, Toyota Aichi-ken (JP)

(72) Inventor: Kazuhito Yamamoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 155 days.

(21) Appl. No.: 16/935,793

(22) Filed: Jul. 22, 2020

(65) Prior Publication Data
US 2021/0061220 A1 Mar. 4, 2021

(30) Foreign Application Priority Data

Aug. 30, 2019 (JP) .............................. JP2019-158695

(51) Int. Cl.
*B60R 22/343* (2006.01)
*B60R 22/18* (2006.01)
*B60R 21/01* (2006.01)

(52) U.S. Cl.
CPC ............ *B60R 22/343* (2013.01); *B60R 21/01* (2013.01); *B60R 22/18* (2013.01); *B60R 2021/01265* (2013.01); *B60R 2022/1806* (2013.01)

(58) Field of Classification Search
CPC ....... B60R 22/343; B60R 22/34; B60R 22/36; B60R 22/405; B60R 21/01
See application file for complete search history.

(56) References Cited

U.S. PATENT DOCUMENTS

| 4,159,084 A | * | 6/1979 | Mori | ..................... | B60R 22/36 |
| | | | | | 242/378.1 |
| 6,332,629 B1 | * | 12/2001 | Midorikawa | ......... | B60R 22/343 |
| | | | | | 242/390.8 |
| 2004/0195420 A1 | | 10/2004 | Schnabl | | |
| 2011/0174911 A1 | * | 7/2011 | Takamatsu | ............ | B60R 22/405 |
| | | | | | 242/384 |
| 2016/0347275 A1 | * | 12/2016 | Hodatsu | ................ | B60R 22/405 |
| 2020/0023809 A1 | | 1/2020 | Yamamoto | | |

FOREIGN PATENT DOCUMENTS

| EP | 112033 A | * | 6/1984 | ........... B60R 22/405 |
| JP | 2000-038111 A | | 2/2000 | |
| JP | 2000-071936 A | | 3/2000 | |
| JP | 2004-262448 A | | 9/2004 | |
| JP | 2009-280107 A | | 12/2009 | |
| JP | 2020-019470 A | | 2/2020 | |

* cited by examiner

*Primary Examiner* — James A English
(74) *Attorney, Agent, or Firm* — Dinsmore & Shohl LLP

(57) ABSTRACT

A vehicle seatbelt device includes a ratchet wheel rotatable together with a spool in an integrated manner, and an engagingly locking portion. When the spool is rotated in a drawing direction at an angular acceleration larger than a predetermined angular acceleration, the engagingly locking portion is displaced radially outwardly so as to be engagingly locked by an engagingly locked portion. Hereby, rotation of the spool in the drawing direction is locked. Here, a control rod is placed axially outward of the engagingly locking portion. The control rod is displaced in the radial direction along with movement of the locking-inhibition movable portion. Along with the displacement of the control rod, a collar member is displaced axially to a restriction position. At the restriction position, the collar member enters a rotation raceway of the engagingly locking portion so as to restrict the engagingly locking portion from being displaced radially outwardly.

7 Claims, 8 Drawing Sheets

VEHICLE SEATBELT DEVICE

CROSS-REFERENCE TO RELATED APPLICATIONS

This application claims priority to Japanese Patent Application No. 2019-158695 filed on Aug. 30, 2019, which is incorporated herein by reference in its entirety including the specification, drawings and abstract.

BACKGROUND

1. Technical Field

The present disclosure relates to a vehicle seatbelt device.

2. Description of Related Art

Japanese Unexamined Patent Application Publication No. 2009-280107 (JP 2009-280107 A) describes a vehicle seatbelt device including a locking mechanism configured to lock rotation of a spool that winds up webbing and a locking inhibition mechanism configured to inhibit unnecessary locking of the spool. The locking mechanism of the vehicle seatbelt device includes an engagingly locking member provided in a base plate rotating together with the spool in an integrated manner. The engagingly locking member is pivotally supported by the base plate in a swingable manner, and when the spool rotates in a drawing direction of the webbing at a predetermined rotation speed or more, the engagingly locking member is displaced in accordance with inertia force. Then, the engagingly locking member is engagingly locked by an engagingly locking tooth formed in a frame of a retractor, so that the rotation of the spool is locked.

Further, the locking inhibition mechanism of the vehicle seatbelt device includes a solenoid including a movable core that is movable along the axial direction of the spool, and a ring plate connected to a distal end of the movable core and configured to be displaced in the axial direction of the spool. When the ring member is displaced in a direction where the ring member approaches the engagingly locking member along with movement of the movable core, a columnar portion projecting from the engagingly locking member is engagingly locked by an inner peripheral portion of the ring member, so that swinging of the engagingly locking member is restricted. Hereby, the rotation of the spool can be inhibited from being locked.

SUMMARY

However, in the technology described in JP 2009-280107 A, swinging of the engagingly locking member is restricted by the movable core moving along the axial direction of the spool and the ring member displaced together with the movable core. On this account, in order to secure strokes for the movable core and the ring member to be displaced, the whole device is upsized in the axial direction of the spool.

The present disclosure is achieved in consideration of the above fact, and an object of the present disclosure is to restrain upsizing of a vehicle seatbelt device including a mechanism configured to restrain unnecessary locking of rotation of a spool.

A vehicle seatbelt device according to a first aspect includes a spool, a rotary portion, an engagingly locking portion, an engagingly locked portion, a first displacement portion, and a second displacement portion. Webbing to be put on an occupant is wound up around the spool, and the spool is configured to rotate in a drawing direction when the webbing is drawn. The rotary portion is provided on a first side of the spool in an axial direction of the spool, and the rotary portion is rotatable together with the spool in an integrated manner. The engagingly locking portion is supported by the rotary portion in a relatively rotatable manner, and the engagingly locking portion is configured such that, in a case where the spool is rotated in the drawing direction at an angular acceleration larger than a predetermined angular acceleration, the engagingly locking portion rotates relative to the rotary portion by inertia force and is displaced outwardly in a radial direction of the spool. The engagingly locked portion is provided outward of the engagingly locking portion in the radial direction of the spool, and the engagingly locked portion is configured to lock rotation of the spool in the drawing direction when the engagingly locking portion is engagingly locked by the engagingly locked portion. The first displacement portion is provided outward of the engagingly locking portion in the axial direction of the spool, the first displacement portion being supported by a locking-inhibition movable portion configured to be moved by current application, and the first displacement portion is configured to be displaced along the radial direction of the spool along with the movement of the locking-inhibition movable portion. The second displacement portion is configured to be displaced along the axial direction of the spool from an allowable position to a restriction position along with the displacement of the first displacement portion. The allowable position is a position at which the second displacement portion does not enter a rotation raceway on which the engagingly locking portion rotates relative to the rotary portion, and the restriction position is a position at which the second displacement portion enters the rotation raceway so as to restrict the engagingly locking portion from being displaced outwardly in the radial direction of the spool.

In the vehicle seatbelt device according to the first aspect, the webbing is drawn from the spool, so that an occupant wears the webbing. Further, the engagingly locking portion is supported by the rotary portion provide on the first side of the spool in the axial direction, and the spool, the rotary portion, and the engagingly locking portion rotate together in an integrated manner. When the spool is rotated in the drawing direction at an angular acceleration larger than the predetermined angular acceleration, the engagingly locking portion rotates relative to the rotary portion by inertia force and is displaced outwardly in the radial direction of the spool. Hereby, the engagingly locking portion is engagingly locked by the engagingly locked portion, so that rotation of the spool in the drawing direction is locked. As such, when the webbing is suddenly drawn from the spool in emergency of the vehicle, for example, that is, when the spool is rotated in the drawing direction at an angular acceleration larger than the predetermined angular acceleration, rotation of the spool in the drawing direction is locked, so that drawing of the webbing from the spool is restricted. As a result, it is possible to restrict the body of the occupant.

In the meantime, when the rotation of the spool in the drawing direction is locked under a situation in which it is not necessary to restrict drawing of the webbing, a wearing operation of the webbing may be restricted, or the body of the occupant may be restricted unnecessarily. On this account, unnecessary locking of rotation of the spool may be restrained.

Here, in the vehicle seatbelt device according to the first aspect, the locking-inhibition movable portion is moved so as to inhibit unnecessary locking of rotation of the spool. More specifically, the locking-inhibition movable portion is moved by current application. When the locking-inhibition movable portion is moved, the first displacement portion is displaced along the radial direction of the spool, the first displacement portion being placed outward of the engagingly locking portion in the axial direction of the spool. Further, along with the displacement of the first displacement portion, the second displacement portion is displaced along the axial direction of the spool from the allowable position to the restriction position. When the second displacement portion is displaced to the restriction position, the second displacement portion enters the rotation raceway on which the engagingly locking portion rotates relative to the rotary portion, so that the engagingly locking portion is restricted from being displaced outwardly in the radial direction of the spool. Hereby, the engagingly locking portion is restricted from being engagingly locked by the engagingly locked portion, thereby inhibiting locking of rotation of the spool in the drawing direction. When the locking-inhibition movable portion is moved under a situation in which it is not necessary to restrict drawing of the webbing, for example, it is possible to restrain unnecessary locking of rotation of the spool.

Further, in the above configuration, restriction and release of displacement of the engagingly locking portion are performed by displacement of the second displacement portion along the axial direction of the spool. The displacement of the second displacement portion is performed via the first displacement portion displaced along the radial direction of the spool. On this account, it is possible to restrain upsizing of the whole device in the axial direction of the spool in comparison with a configuration in which restriction and release of displacement of the engagingly locking portion are performed by providing a plurality of members having a motion range in the axial direction of the spool.

A vehicle seatbelt device according to a second aspect is configured as follows. That is, in addition to the configuration of the first aspect, the vehicle seatbelt device may include an engaged portion and an engageable portion. The engaged portion is provided in an outer end portion of the rotary portion in the radial direction of the spool. The engageable portion is provided outward of the rotary portion in the radial direction of the spool. The engageable portion is supported by a locking movable portion configured to be moved by current application in case of emergency of a vehicle. The engageable portion is configured to lock rotation of the spool in the drawing direction such that the engageable portion is engaged with the engaged portion by being displaced inwardly in the radial direction of the spool along with movement of the locking movable portion.

In the vehicle seatbelt device according to the second aspect, the locking movable portion is moved by current application in case of emergency of the vehicle. When the locking movable portion is moved, the engageable portion is displaced inwardly in the radial direction of the spool and engaged with the engaged portion provided in the rotary portion. Hereby, rotation of the spool in the drawing direction is locked. As such, the locking movable portion is moved by electrically receiving information from a sensor device configured to detect emergency of the vehicle, for example, so that rotation of the spool in the drawing direction can be locked. In the meantime, even in a case where the locking movable portion is not moved due to occurrence of a defect or the like in an electric system in case of emergency of the vehicle, when the spool is rotated in the drawing direction at an angular acceleration larger than the predetermined angular acceleration, rotation of the spool is locked. Hereby, emergency safe performance is improved.

A vehicle seatbelt device according to a third aspect is configured as follows. That is, in addition to the configuration of the second aspect, the vehicle seatbelt device may include a support member and an electromagnet. The support member includes a permanent magnet and is configured to be tiltable around a support shaft extending along the axial direction of the spool, the support member being configured such that a first side of the support member relative to the support shaft serves as the locking movable portion, and a second side of the support member relative to the support shaft serves as the locking-inhibition movable portion. The electromagnet is placed to face the permanent magnet, the electromagnet including a core formed by use of a magnetic material, and a coiled portion placed around the core. In the vehicle seatbelt device, when a current is applied to the coiled portion in a first direction, the support member may tilt toward a first side due to a magnetic force caused between the permanent magnet and the electromagnet so that the locking movable portion is moved, and when a current is applied to the coiled portion in a second direction opposite to the first direction, the support member may tilt toward a second side due to a magnetic force caused between the permanent magnet and the electromagnet so that the locking-inhibition movable portion is moved.

The vehicle seatbelt device according to the third aspect includes the support member including the permanent magnet. The support member is tiltable around the support shaft extending along the axial direction of the spool. Further, the first side of the support member relative to the support shaft serves as the locking movable portion, and the second side of the support member relative to the support shaft serves as the locking-inhibition movable portion. Further, the electromagnet including the core and the coiled portion is placed to face the permanent magnet of the support member. When a current is applied to the coiled portion in the first direction, the support member is tilted by a magnetic force, so that the locking movable portion moves. In the meantime, when a current is applied to the coiled portion in the second direction, the support member is tilted by a magnetic force, so that the locking-inhibition movable portion moves. Thus, the locking movable portion and the locking-inhibition movable portion can be provided in a single support member. Hereby, in comparison with a configuration where respective actuators configured to move the locking movable portion and the locking-inhibition movable portion are provided separately, the vehicle seatbelt device can be constituted by a small number of members, thereby making it possible to restrain upsizing of the whole device. Further, it is possible to restrain consumption of electric power along with current application to the locking movable portion and the locking-inhibition movable portion.

A vehicle seatbelt device according to a fourth aspect is configured as follows. That is, in addition to the configuration of the third aspect, the first displacement portion may be biased outwardly in the radial direction of the spool by a first biasing member. The engageable portion may be biased outwardly in the radial direction of the spool by a second biasing member. In a state where no current is applied to the coiled portion, the support member may be restricted from tilting by biasing forces of the first biasing member and the second biasing member.

In the vehicle seatbelt device according to the fourth aspect, biasing forces of the first biasing member and the second biasing member are given to the support member via the first displacement portion and the engageable portion. In a state where no current is applied to the coiled portion, tilting of the support member is restricted by those biasing forces. Hereby, it is possible to restrict movement of the locking movable portion and the locking-inhibition movable portion in a state where no current is applied to the coiled portion. This makes it possible to restrain malfunction of the vehicle seatbelt device.

A vehicle seatbelt device according to a fifth aspect is configured as follows. That is, in addition to the configuration of any one of the first to fourth aspects, the first displacement portion may be formed in an elongated shape with a longitudinal direction being along the radial direction of the spool. A first end of the first displacement portion in the longitudinal direction may be supported by the locking-inhibition movable portion while a second end of the first displacement portion in the longitudinal direction includes opposing walls placed to face the second displacement portion. The second displacement portion may include projection portions penetrating through cam holes formed in the opposing walls. When the projection portions slide along the cam holes along with displacement of the first displacement portion, the second displacement portion may be displaceable along the axial direction of the spool.

In the vehicle seatbelt device according to the fifth aspect, the first end of the first displacement portion in the longitudinal direction is provided with the opposing walls placed to face the second displacement portion, and the cam holes are formed in the opposing walls. The second displacement portion includes the projection portions penetrating through the cam holes, and when the projection portions slide along the cam holes along with displacement of the first displacement portion, the second displacement portion is displaced in the axial direction of the spool. Thus, with a simple configuration, the second displacement portion can be displaced, and unnecessary locking of rotation of the spool can be inhibited.

A vehicle seatbelt device according to a sixth aspect is configured as follows. That is, in addition to the configuration of any one of the first to fifth aspects, the vehicle seatbelt device may include a tongue passed through the webbing, a buckle with which the tongue is engageable, a first detection portion configured to detect whether an engaged state where the tongue is engaged with the buckle is established or not, and a controlling portion configured to move the locking-inhibition movable portion by current application when the controlling portion determines that the engaged state is not established based on information from the first detection portion.

In the vehicle seatbelt device according to the sixth aspect, in a case where the tongue is not engaged with the buckle, the locking-inhibition movable portion is moved. Hereby, in a case where the webbing is suddenly drawn from the spool because an occupant is to wear the webbing hastily, that is, in a case where the spool is rotated in the drawing direction at an angular acceleration larger than a predetermined angular acceleration under a situation in which it is not necessary to restrict drawing of the webbing, it is possible to restrain unnecessary locking of rotation of the spool.

A vehicle seatbelt device according to a seventh aspect is configured as follows. That is, in addition to the configuration of the sixth aspect, the vehicle seatbelt device may include a second detection portion and a third detection portion. The second detection portion is configured to detect whether a vehicle is in emergency or not. The third detection portion is configured to detect whether or not the spool is rotated in the drawing direction at the angular acceleration larger than the predetermined angular acceleration. In a case where the controlling portion determines that the engaged state is established based on information from the first detection portion, the controlling portion determines that the vehicle is not in emergency based on information from the second detection portion, and the controlling portion determines that the spool is rotated in the drawing direction at the angular acceleration larger than the predetermined angular acceleration based on information from the third detection portion, the controlling portion may move the locking-inhibition movable portion by current application.

In the vehicle seatbelt device according to the seventh aspect, in a case where the spool is rotated in the drawing direction at an angular acceleration larger than the predetermined angular acceleration in a state where the tongue is engaged with the buckle under a situation in which the vehicle is not in emergency, the locking-inhibition movable portion is moved. Hereby, it is possible to restrain unnecessary locking of rotation of the spool under a situation in which it is not necessary to restrict drawing of the webbing, e.g., in a case where the spool is rotated in the drawing direction at an angular acceleration larger than the predetermined angular acceleration because the occupant wearing the webbing suddenly changes a posture in a normal time.

As described above, the vehicle seatbelt device according to the first aspect has such an excellent effect that, in the vehicle seatbelt device including a mechanism that restrains unnecessary locking of rotation of the spool, upsizing of the device can be restrained.

The vehicle seatbelt device according to the second aspect has such an excellent effect that safe performance of the vehicle seatbelt device can be improved.

The vehicle seatbelt device according to the third aspect has such an excellent effect that upsizing of the whole device and consumption of electric power in the vehicle seatbelt device can be restrained.

The vehicle seatbelt device according to the fourth aspect has such an excellent effect that malfunction of the vehicle seatbelt device can be restrained.

The vehicle seatbelt device according to the fifth aspect has such an excellent effect that unnecessary locking of rotation of the spool can be inhibited with a simple configuration.

The vehicle seatbelt device according to the sixth aspect has such an excellent effect that unnecessary locking of rotation of the spool can be restrained when an occupant is to wear the webbing hastily.

The vehicle seatbelt device according to the seventh aspect has such an excellent effect that unnecessary locking of rotation of the spool in a normal time in which the vehicle is not in emergency can be restrained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes a vehicle seatbelt device 10 according to the present embodiment with reference to FIGS. 1 to 8B. Note that an arrow-Z direction, an arrow-R direction, and an arrow-C direction illustrated in those figures as appropriate indicate the axial direction, the radial direction, and the circumferential direction of a spool, respectively. Further, when an axial direction, a radial direction, and a circumferential direction are just referred to, they indicate the axial direction, the radial direction, and the circumferential direction of the spool, respectively, unless otherwise specified. Further, in each of the figures, some reference signs may be omitted for understandability of a drawing.

Outline

Figure 1:
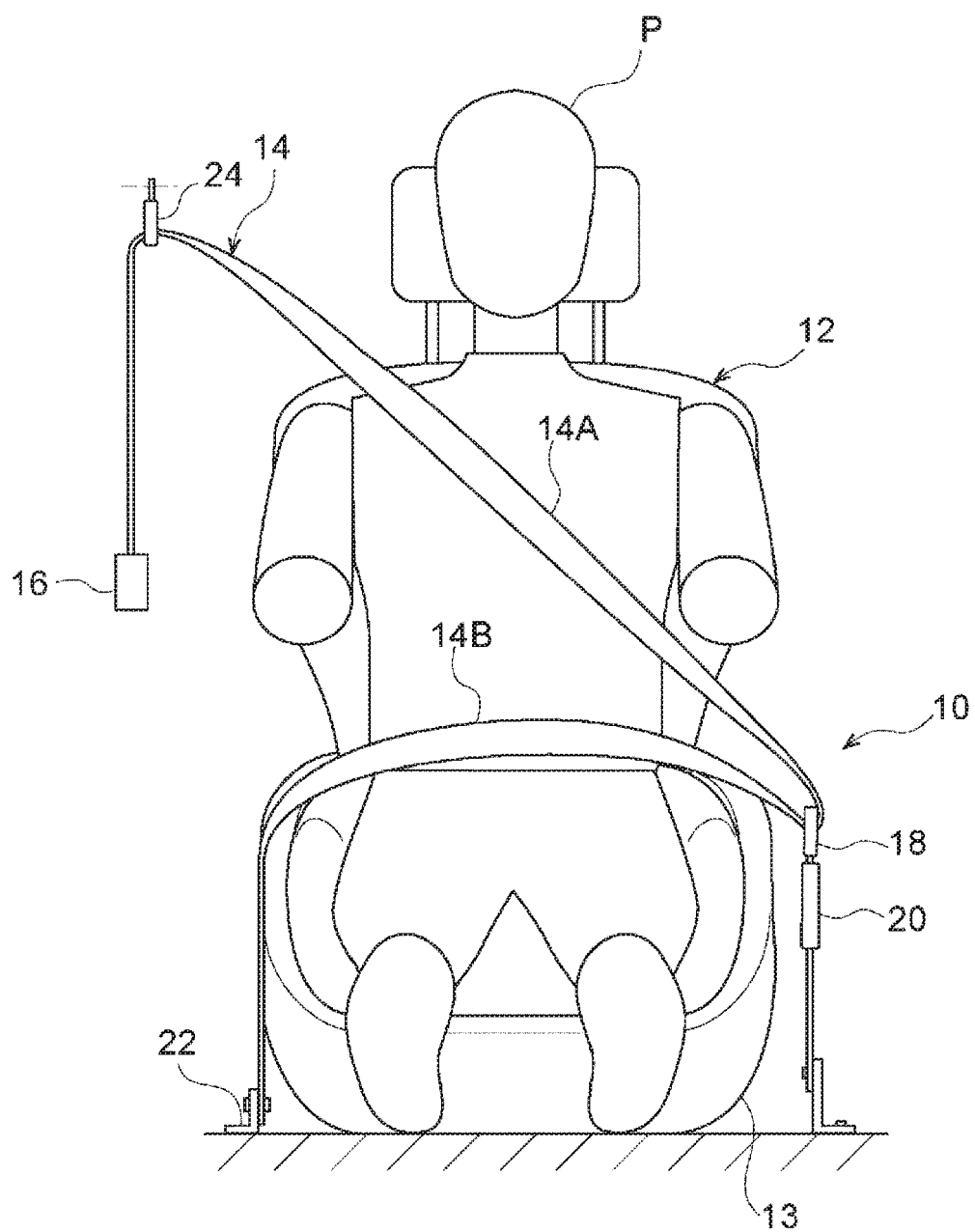
FIG. 1 is a front view illustrating a vehicle seat to which a vehicle seatbelt device according to the present embodiment is applied.

As illustrated in FIG. 1, a vehicle seatbelt device 10 is provided around a vehicle seat 12 constituting a driver seat of a vehicle. The vehicle seatbelt device 10 is a so-called three-point seatbelt device and includes a webbing 14, a retractor 16, a tongue 18, and a buckle 20.

The webbing 14 is a non-stretch belt-shaped member configured to restrict an occupant P seated in the vehicle seat 12. A first end portion of the webbing 14 is placed outward of the vehicle seat 12 in the seat width direction and is engagingly locked by the retractor 16 placed in a lower part of a center pillar (not shown). Further, a second end portion of the webbing 14 is placed outward of the vehicle seat 12 in the seat width direction and is fixed to an anchor member 22 attached to a vehicle body floor. Further, an intermediate part of the webbing 14 is passed through a shoulder anchor 24 disposed in an upper part of the center pillar and folded back.

The retractor 16 is a winder that enables winding or drawing of the webbing 14. Details of the retractor 16 will be described later.

The tongue 18 is an insertion tool through which the webbing 14 is passed, and a part, of the webbing 14, from the shoulder anchor 24 to the anchor member 22 is folded back by the tongue 18. Hereby, a part of the webbing 14 above the tongue 18 in the seat up-down direction is a shoulder webbing portion 14A configured to restrict a shoulder and a chest of the occupant P, and a part of the webbing 14 below the tongue 18 in the seat up-down direction is a lap webbing portion 14B configured to restrict a lumbar part of the occupant P.

The buckle 20 is placed in an inner part, in the seat width direction, of a seat cushion 13 of the vehicle seat 12 and is configured to be engageable with a tongue plate (not shown) provided in a distal end of the tongue 18.

Retractor 16

Next will be described a configuration of the retractor 16 in detail.

Figure 2:
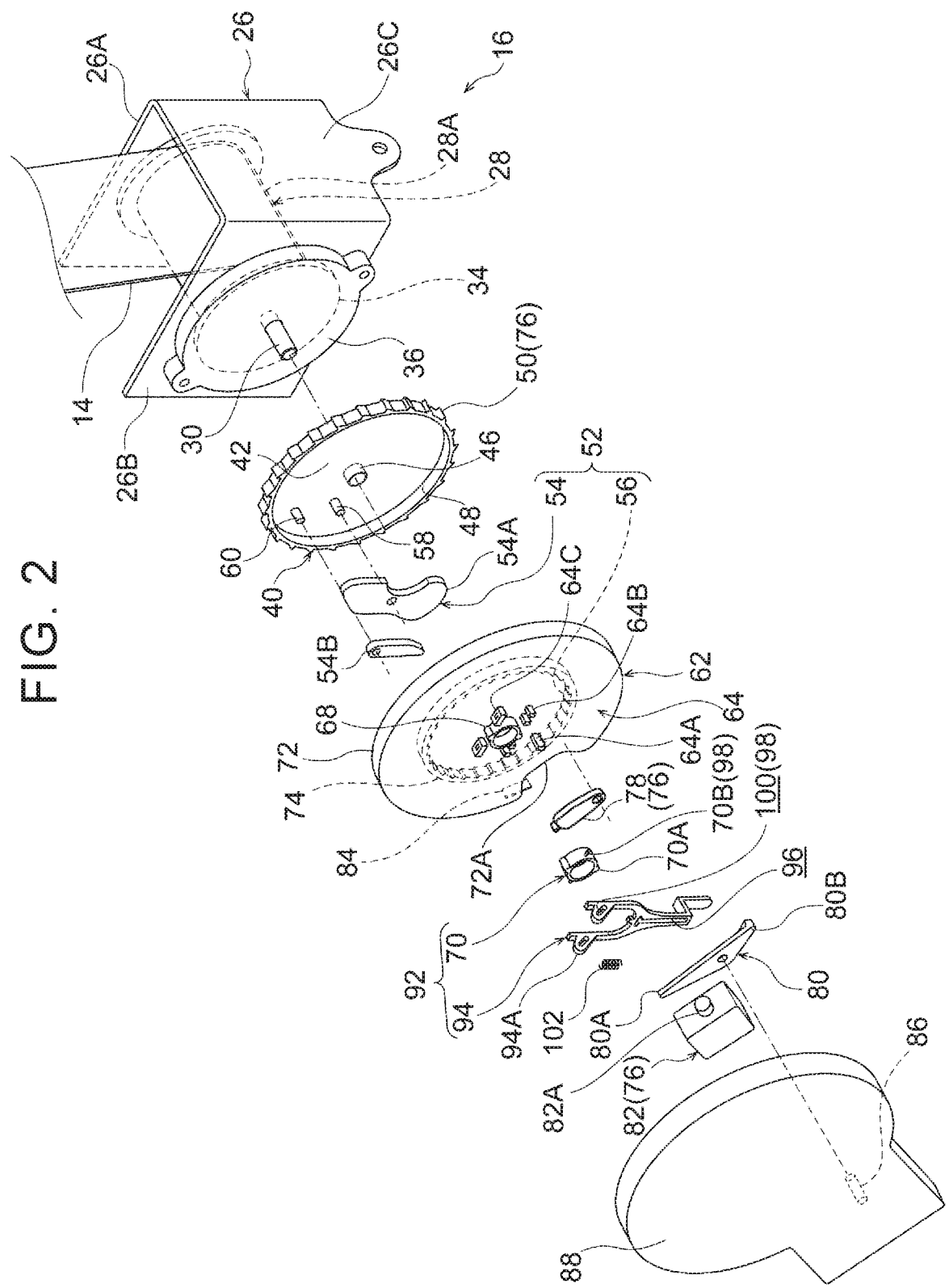
FIG. 2 is an exploded perspective view of a retractor illustrated in FIG. 1.

As illustrated in FIG. 2, the retractor 16 includes a frame 26. The frame 26 includes a pair of side walls 26A, 26B provided such that the side walls 26A, 26B face each other, and a base wall 26C connecting first end portions of the side walls 26A, 26B to each other. A spool 28 is placed inside the side walls 26A, 26B.

The spool 28 is formed generally in a cylindrical shape and includes a winding portion 28A by which a first end of the webbing 14 is engagingly locked. The spool 28 is placed such that its axial direction is along a direction where the side walls 26A, 26B face each other, and the spool 28 is rotatable around its central axis.

The spool 28 is biased in a winding direction (a direction opposite to the arrow-C direction in FIG. 3) by a spring (not shown) placed on the side wall 26A. Hereby, the webbing 14 is wound up around the winding portion 28A of the spool 28. Further, when the webbing 14 is drawn from the spool 28, the spool 28 is rotated in a drawing direction (the arrow-C direction).

Figure 3:
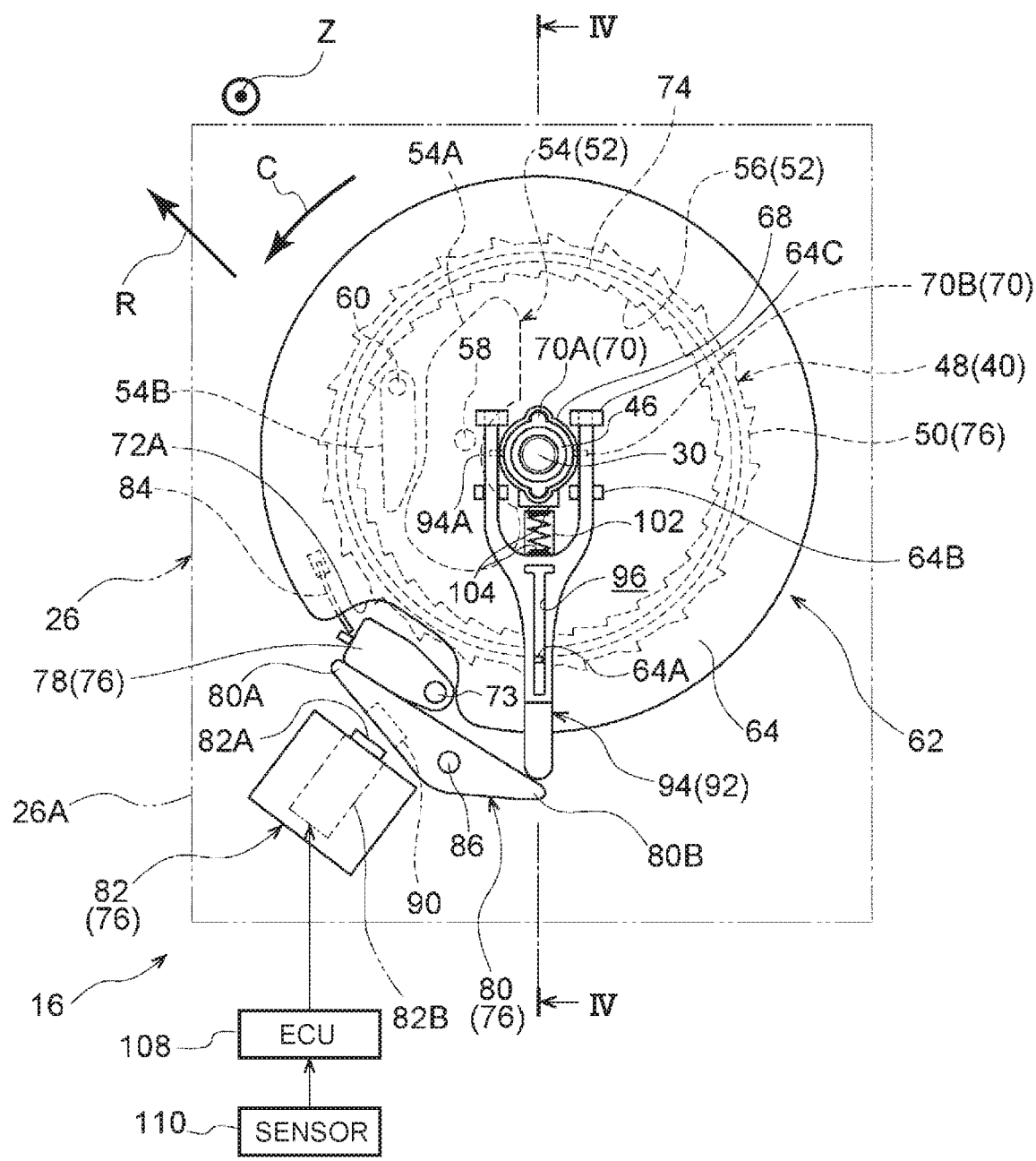
FIG. 3 is an enlarged front view of a part of the retractor illustrated in FIG. 1 when the retractor is viewed from the axial direction of a spool.
Figure 4:
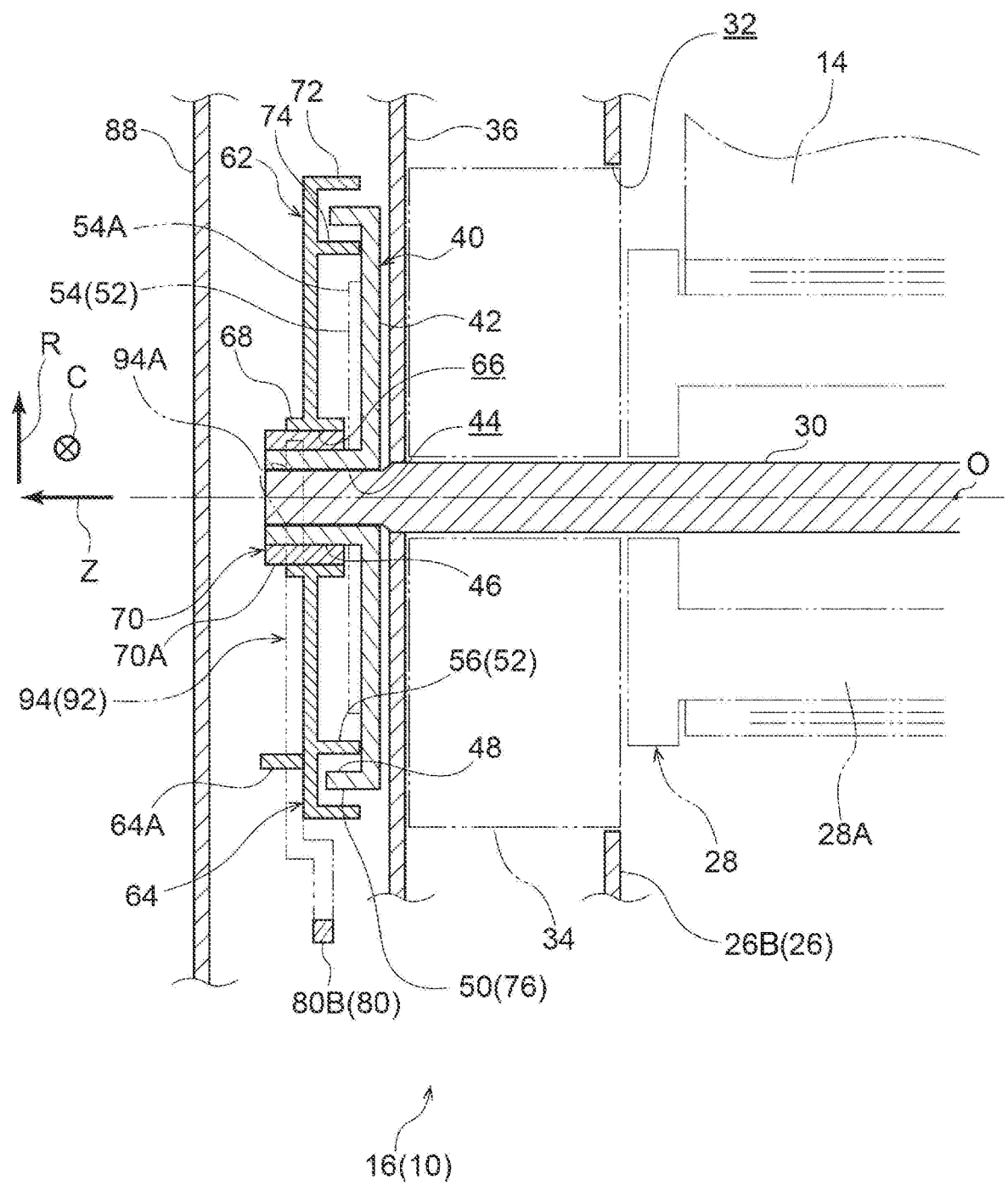
FIG. 4 is a partially enlarged sectional view of the retractor taken along a line IV-IV in FIG. 3.
Figure 5:
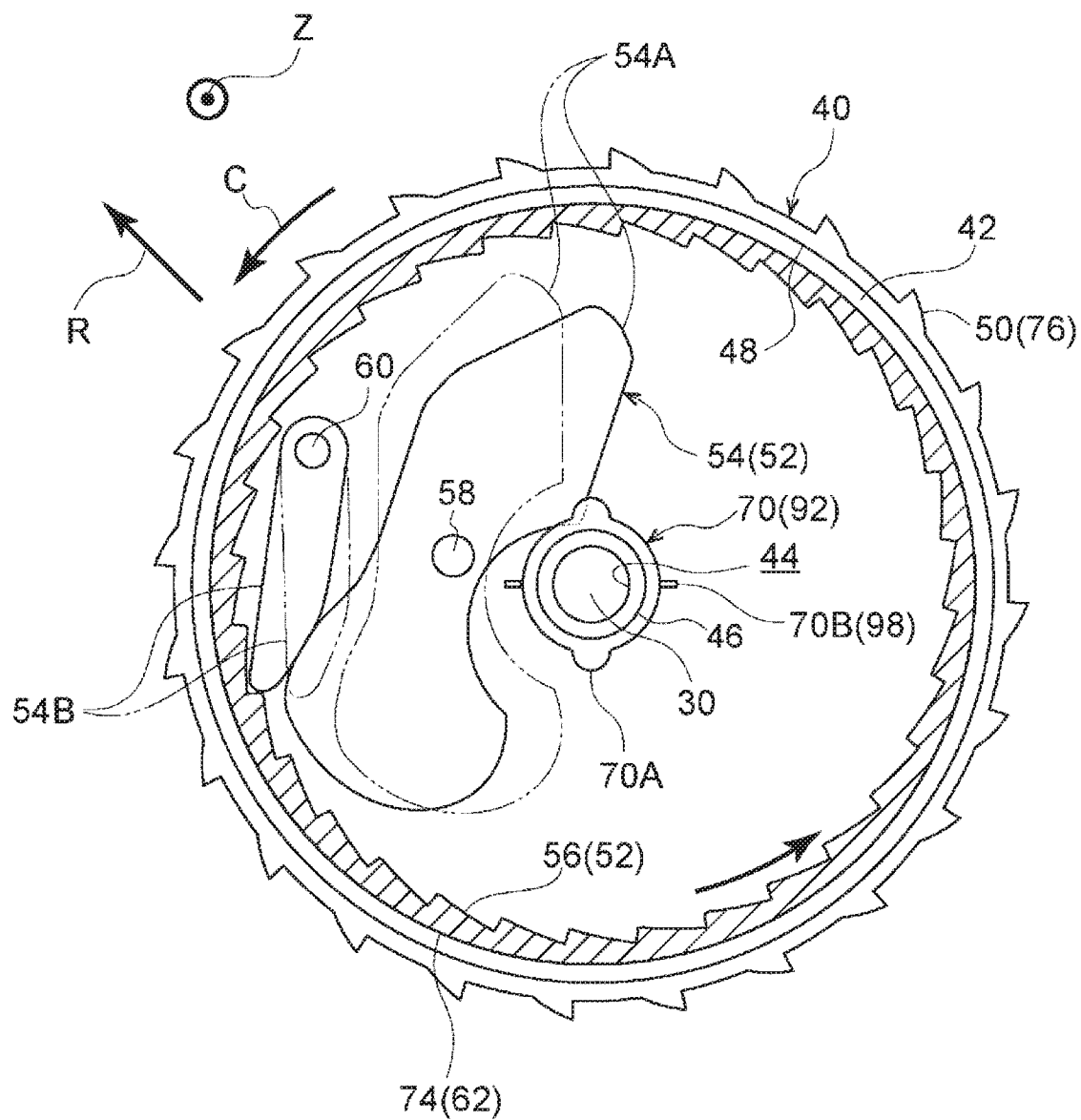
FIG. 5 is a schematic view of a webbing sensor mechanism provided in the retractor according to the present embodiment and illustrates a position of an engagingly locking portion before operation in an alternate long and two short dashes line and a position of the engagingly locking portion after operation in a continuous line.
Figure 6:
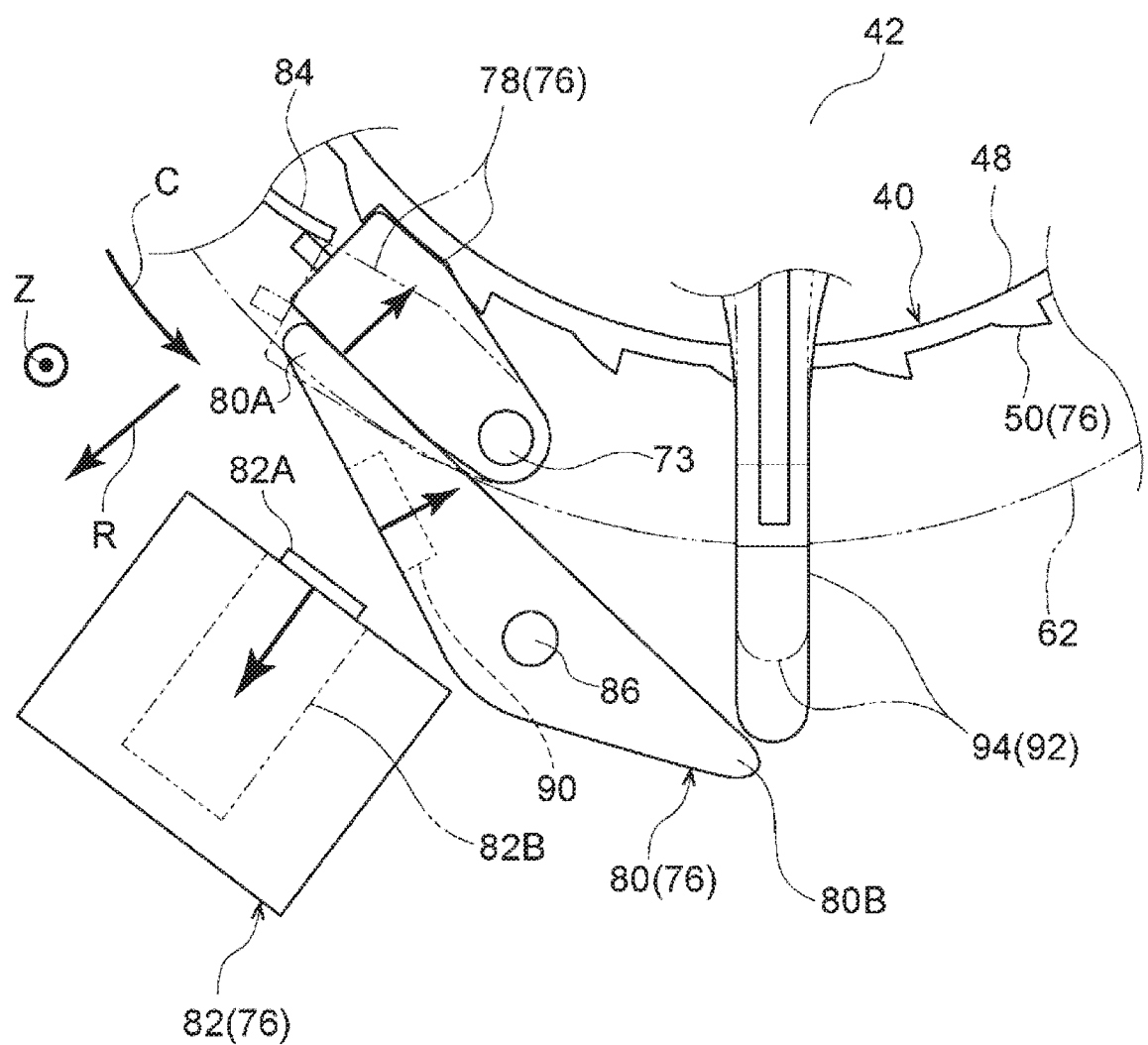
FIG. 6 is a schematic view of a vehicle sensor mechanism provided in the retractor according to the present embodiment and illustrates a position of an engageable portion before operation in an alternate long and two short dashes line and a position of the engageable portion after operation in a continuous line.
Figure 7:
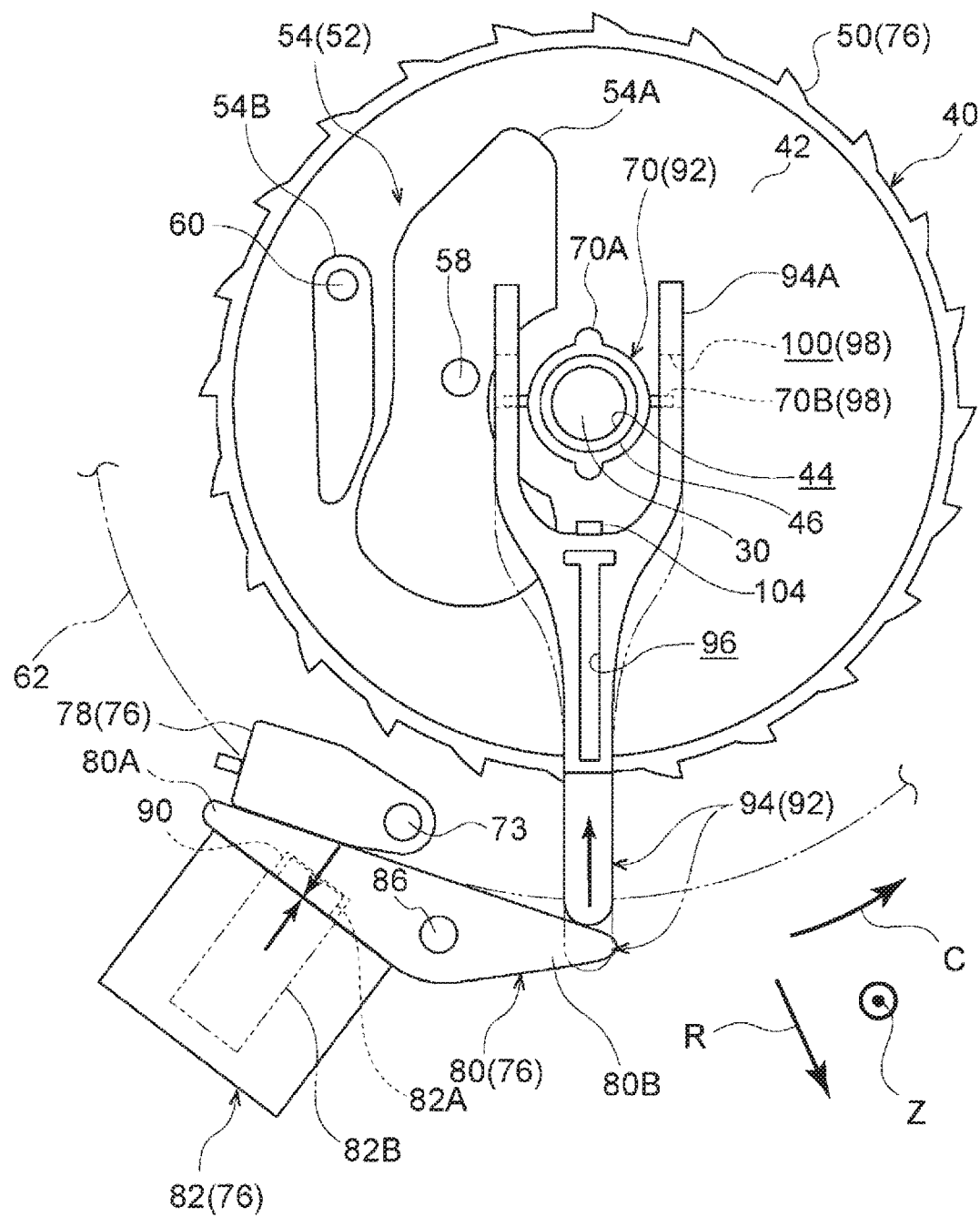
FIG. 7 is a schematic view of a spool locking inhibition mechanism provided in the retractor according to the present embodiment and illustrates a position of a control rod before operation in an alternate long and two short dashes line and a position of the control rod after operation in a continuous line.

As illustrated in FIGS. 3 and 4, a shaft portion 30 formed generally in a columnar shape is coaxially placed in an axial core part of the spool 28. A first end of the shaft portion 30 in the axial direction is placed inside the spool 28 and fixed to the spool 28. In the meantime, a second end of the shaft portion 30 in the axial direction projects from a first side of the spool 28 and extends to outside the frame 26 through a hole 32 formed in the side wall 26B of the frame 26. Note that, in the following description, "axially outward" indicates a direction separated from a center O of the spool 28 illustrated in FIG. 4 in the axial direction of the spool 28.

A locking mechanism 34 is provided axially outward of the side wall 26B of the frame 26. Further, a cover plate 36 is placed axially outward of the locking mechanism 34, and the cover plate 36 is fixed to the side wall 26B so as to cover the locking mechanism 34. The locking mechanism 34 is a well-known locking mechanism configured to restrict rotation of the spool 28. As an example, the locking mechanism 34 includes a lock base connected to the shaft portion 30 of the spool 28 and configured to rotate together with the spool 28 in an integrated manner, and a lock gear attached to the lock base in a tiltable manner. The lock base and the lock gear are each provided with engaging teeth configured to engage with ratchet teeth provided in the hole 32 of the side wall 26B of the frame 26. In case of emergency or the like of the vehicle, the engaging teeth of the lock base and the lock gear engage with the ratchet teeth, so that rotation of the lock base is restricted and rotation of the spool 28 in the drawing direction is locked. In the present embodiment, the lock base is connected to a lock panel 62 (described later) via a connecting member (not shown). The connecting member penetrates through a cam hole (not shown) formed in the cover plate 36. When a webbing sensor mechanism 52 or a vehicle sensor mechanism 76 (described later) operates, the lock panel 62 is rotated by a predetermined angle (18° in the present embodiment) in the drawing direction of the spool 28. Hereby, the connecting member is displaced along the cam hole along with the rotation of the lock panel 62, so that the engaging teeth of the lock base and the lock gear are engaged with the ratchet teeth.

A ratchet wheel 40 as a rotary portion formed generally in a disk shape is placed axially outward of the cover plate 36. The ratchet wheel 40 is placed coaxially with the spool 28. The ratchet wheel 40 includes a base 42 formed generally in a circular shape when the base 42 is viewed from the axial direction, a through-hole 44 formed in the center of the base 42, a tubular fixing portion 46 provided in a standing manner toward the outer side in the axial direction from a peripheral portion (a radially outer end portion) of the through-hole 44, and a peripheral wall portion 48 provided in a standing manner toward the outer side in the axial direction from a peripheral portion of the base 42.

In the ratchet wheel 40, the shaft portion 30 of the spool 28 penetrates through the fixing portion 46 formed in the center of the base 42 such that the shaft portion 30 is connected to the fixing portion 46. Hereby, the ratchet wheel 40 is rotatable together with the spool 28 in an integrated manner. Further, an engaged portion 50 is formed on an outer peripheral surface of the peripheral wall portion 48 of the ratchet wheel 40. The engaged portion 50 is constituted by a plurality of engaging teeth formed on the outer peripheral surface of the peripheral wall portion 48 along the circumferential direction, thereby constituting the vehicle sensor mechanism 76 (described later).

Webbing Sensor Mechanism 52

In the meantime, an engagingly locking portion 54 constituting the webbing sensor mechanism 52 is placed on the base 42 of the ratchet wheel 40. The webbing sensor mechanism 52 has a function to restrict rotation of the spool 28 when the spool 28 is rotated in the drawing direction at an angular acceleration larger than a predetermined angular acceleration. The webbing sensor mechanism 52 includes the engagingly locking portion 54 and an engagingly locked portion 56 placed radially outward of the engagingly locking portion 54.

The engagingly locking portion 54 is constituted by a weight member 54A and a webbing pawl 54B. The weight member 54A is a plate piece made of a metallic material with its plate-thickness direction being along the axial direction and having a generally gourd shape when the weight member 54A is viewed from the axial direction. The weight member 54A includes a first support pin 58 extending in the axial direction from a central part including a gravitational center, and the weight member 54A is supported in a relatively rotatable manner to the ratchet wheel 40 at a position radially outward of the rotation center (the shaft portion 30) of the ratchet wheel 40 via the first support pin 58.

The webbing pawl 54B is supported by the base 42 of the ratchet wheel 40 in a relatively rotatable manner at a position radially outward of the weight member 54A. The webbing pawl 54B is a plate piece formed by use of a metallic material with its plate-thickness direction being along the axial direction and having an elongated pawl shape when the webbing pawl 54B is viewed from the axial direction. Further, the webbing pawl 54B includes a second support pin 60 extending in the axial direction from a first end of the webbing pawl 54B in its longitudinal direction, such that the webbing pawl 54B is supported by the ratchet wheel 40 via the second support pin 60.

In the meantime, the engagingly locked portion 56 is formed in the lock panel 62 placed axially outward of the ratchet wheel 40. The lock panel 62 is formed in a disc shape one size larger than the ratchet wheel 40 and is placed coaxially with the ratchet wheel 40. The lock panel 62 includes a base portion 64 with its plate-thickness direction being along the axial direction, the base portion 64 being formed generally in a circular shape when the base portion 64 is viewed from the axial direction. A support hole 66 penetrating through the base portion 64 in the plate-thickness direction is formed in the center of the base portion 64. A support portion 68 having a cylindrical shape is formed integrally with the support hole 66 such that the support portion 68 extends axially inwardly and outwardly from a peripheral portion of the support hole 66. Further, the fixing portion 46 provided in the center of the ratchet wheel 40 is inserted into the support portion 68 via a collar member 70. Hereby, the ratchet wheel 40 supports the lock panel 62 in a relatively rotatable manner. Note that the collar member 70 corresponds to a "second displacement portion" in the present disclosure.

As illustrated in FIG. 3, the collar member 70 is made of a metallic material. The collar member 70 is formed generally in a cylindrical shape and is placed coaxially with the spool 28. Further, a pair of upper and lower guide projection portions 70A is formed on an outer peripheral surface of the collar member 70, and the upper and lower guide projection portions 70A are inserted into guide grooves (no reference sign) formed on an inner peripheral surface of the support portion 68 and extending in the axial direction. Hereby, rotation of the collar member 70 relative to the lock panel 62 is restricted. Further, the collar member 70 slides along the guide grooves, so that the collar member 70 is allowed to be displaced in the axial direction.

An outer wall portion 72 provided in a standing manner toward the inner side in the axial direction is provided in a peripheral portion of the base portion 64. The outer wall portion 72 is partially opened radially outwardly so that a receiving portion 72A configured to receive an engageable portion 78 (described later) is formed. Further, a second end of a fixing pin 73 extending along the axial direction is fixed inside the receiving portion 72A.

Further, an annular inner wall portion 74 provided in a standing manner from the base portion 64 toward the inner side in the axial direction is provided radially inward of the outer wall portion 72. The outer wall portion 72 and the inner wall portion 74 are placed concentrically to each other at a predetermined interval in the radial direction, and the peripheral wall portion 48 of the ratchet wheel 40 is placed between the outer wall portion 72 and the inner wall portion 74. The engagingly locked portion 56 is provided in an inner peripheral portion of the inner wall portion 74. The engagingly locked portion 56 is constituted by a predetermined number of engagingly locking teeth placed along the circumferential direction, and the engagingly locked portion 56 is placed radially outward of the webbing pawl 54B.

The webbing sensor mechanism 52 configured as such operates when the spool 28 is rotated in the drawing direction at an angular acceleration larger than the predetermined angular acceleration. First, as indicated by a continuous line in FIG. 5, the engagingly locking portion 54 rotates relative to the ratchet wheel 40 in accordance with inertia force. More specifically, a part of the weight member 54A (an upper part of the gourd shape illustrated in FIG. 5) on a first side with respect to the autorotation center of the weight member 54A is displaced to a direction approaching the rotation center of the ratchet wheel 40. In the meantime, a part of the weight member 54A (a lower part of the gourd shape) on a second side with respect to the autorotation center is displaced radially outwardly so as to press the webbing pawl 54B. The webbing pawl 54B is pressed by the weight member 54A so as to be displaced radially outwardly, so that the webbing pawl 54B is engagingly locked by the engagingly locked portion 56 of the lock panel 62. After that, when the lock panel 62 is rotated by a predetermined angle in the drawing direction together with the webbing pawl 54B, the rotation of the spool 28 in the drawing direction is locked. Note that, in a schematic view of FIG. 5, for convenience of description, a section of the inner wall portion 74 of the lock panel 62 is illustrated, and an outline of the lock panel 62 is indicated by a solid line.

Vehicle Sensor Mechanism 76

Next will be described the vehicle sensor mechanism 76 provided in the retractor 16. The vehicle sensor mechanism 76 operates by a control of an ECU 108 (described later) and has a function to restrict rotation of the spool in the drawing direction. The vehicle sensor mechanism 76 includes the engaged portion 50 formed in a radially outer end portion of the ratchet wheel 40, the engageable portion 78 placed radially outward of the engaged portion 50, a support member 80 configured to support the engageable portion 78, and an electromagnet 82 placed to face the support member 80.

The engageable portion 78 is placed inside the receiving portion 72A of the lock panel 62. Further, the fixing pin 73 penetrates through a first end of the engageable portion 78 so that the engageable portion 78 is rotatable around a shaft of the fixing pin 73. Further, a distal end of a leaf spring 84 fixed to the lock panel 62 is engagingly locked by a second end of the engageable portion 78, so that the engageable portion 78 is biased radially outwardly by a biasing force of the leaf spring 84.

The support member 80 is a plate piece formed generally in a triangular shape when the support member 80 is viewed from the axial direction, the support member 80 being provided with its plate-thickness direction being along the axial direction. A support shaft 86 extending along the axial direction penetrates through a part of the support member, the part corresponding to one vertex, so that the support member is tiltable around the support shaft 86. Note that the support shaft 86 extends from a sensor cover 88 placed axially outward of the lock panel 62. The sensor cover 88 is placed to cover the lock panel 62 and fixed to the frame 26 of the retractor 16.

A vertex part of the support member 80, the vertex part being placed on a first side relative to the support shaft 86, serves as a locking movable portion 80A, and a second end of the engageable portion 78 is placed on the locking movable portion 80A. Further, a vertex part of the support member 80, the vertex part being placed on a second side relative to the support shaft 86, serves as a locking-inhibition movable portion 80B, and the locking-inhibition movable portion 80B supports a control rod 94 (described later). Further, a permanent magnet 90 is fixed to a surface of the locking movable portion 80A of the support member 80, the surface being on a side opposite to a mounting surface for the engageable portion 78.

As illustrated in FIG. 3, the electromagnet 82 is fixed to the sensor cover 88 via a support member (no reference sign), and the electromagnet 82 includes a core 82A formed by use of a magnetic material, and a coiled portion 82B placed around the core 82A.

The core 82A is a bar-shaped member having a round section and is placed to face, in the radial direction, the permanent magnet 90 fixed to the support member 80. The coiled portion 82B is formed in a tubular shape such that a conductive winding wire is wound in a predetermined shape. The core 82A is inserted into an axial core part of the coiled portion 82B. Further, a current is applied to the coiled portion 82B via a wiring line (not shown).

The vehicle sensor mechanism 76 configured as such operates when a current is applied to the coiled portion 82B in a first direction. More specifically, when a current is applied to the coiled portion 82B in the first direction and a magnetic force resisting the permanent magnet 90 is generated in the core 82A, the locking movable portion 80A of the support member 80 tilts toward the engageable portion 78 side as indicated by a continuous line in FIG. 6. Here, in the present embodiment, the output of the electromagnet 82 is set such that, when a current is applied to the coiled portion 82B in the first direction, the engageable portion 78 is displaced radially inwardly to a position that overlaps an engaging tooth of the engaged portion 50 in the circumferential direction against the biasing force given to the engageable portion 78 from the leaf spring 84. Hereby, the engageable portion 78 is engagingly locked by the engaged portion 50. After that, when the spool 28 rotates in the drawing direction, the engageable portion 78 (the lock panel 62) is rotated in the drawing direction together with the engaged portion 50 that rotates together with the spool 28 in an integrated manner, so that rotation of the spool 28 is locked.

Locking Inhibition Mechanism 92

Next will be described a locking inhibition mechanism 92 provided in the retractor 16. The locking inhibition mechanism 92 has a function to inhibit the operation of the webbing sensor mechanism 52. The locking inhibition mechanism 92 includes the collar member 70 placed in the lock panel 62, and the control rod 94. Note that the control rod 94 corresponds to a "first displacement portion" in the present disclosure.

As illustrated in FIG. 3, the control rod 94 is made of a metallic material. The control rod 94 is formed in an elongated shape with its longitudinal direction being along the radial direction and is attached to an axially outer surface of the lock panel 62. A lower part (a first side in the longitudinal direction) of the control rod 94 is formed in a linear shape when the control rod 94 is viewed from the axial direction, and a distal end part of the control rod 94 is supported by the locking-inhibition movable portion 80B of the support member 80. Further, the lower part of the control rod 94 has an elongated hole 96 penetrating through the control rod 94 in the axial direction and extending along the radial direction. A support projection portion 64A projecting from the base portion 64 of the lock panel 62 penetrates through the elongated hole 96 so as to assist displacement of the control rod 94 along the radial direction.

Further, an upper part (a second side in the longitudinal direction) of the control rod 94 branches off into two, so that a pair of opposing walls 94A is formed. The opposing walls 94A are placed on both sides of the support portion 68 of the lock panel 62 such that the opposing walls 94A are placed inside respective guide grooves 64B and respective distal-end receiving portions 64C formed on both sides of the support portion 68 in the lock panel 62, so that the opposing walls 94A are supported in a slidable manner along the radial direction. Further, the opposing walls 94A are placed to face an outer peripheral surface of the collar member 70 partially projecting axially outwardly from the support portion 68.

The opposing walls 94A are connected to the collar member 70 via a cam mechanism 98. The cam mechanism 98 is constituted by cam holes 100 formed in the opposing walls 94A, and a pair of projection portions 70B formed on the outer peripheral surface of the collar member 70. The cam hole 100 penetrates through its corresponding opposing wall 94A and extends in a direction inclined from the axial direction. In the meantime, the projection portions 70B are formed in a pin shape and extend radially outwardly from the outer peripheral surface of the collar member 70 so as to penetrate through the cam holes 100. Hereby, when the control rod 94 is displaced radially relative to the lock panel 62, the projection portions 70B slide along the cam holes 100, so that the collar member 70 is displaced axially from an allowable position illustrated in FIG. 8A to a restriction position illustrated in FIG. 8B.

Figure 8A:
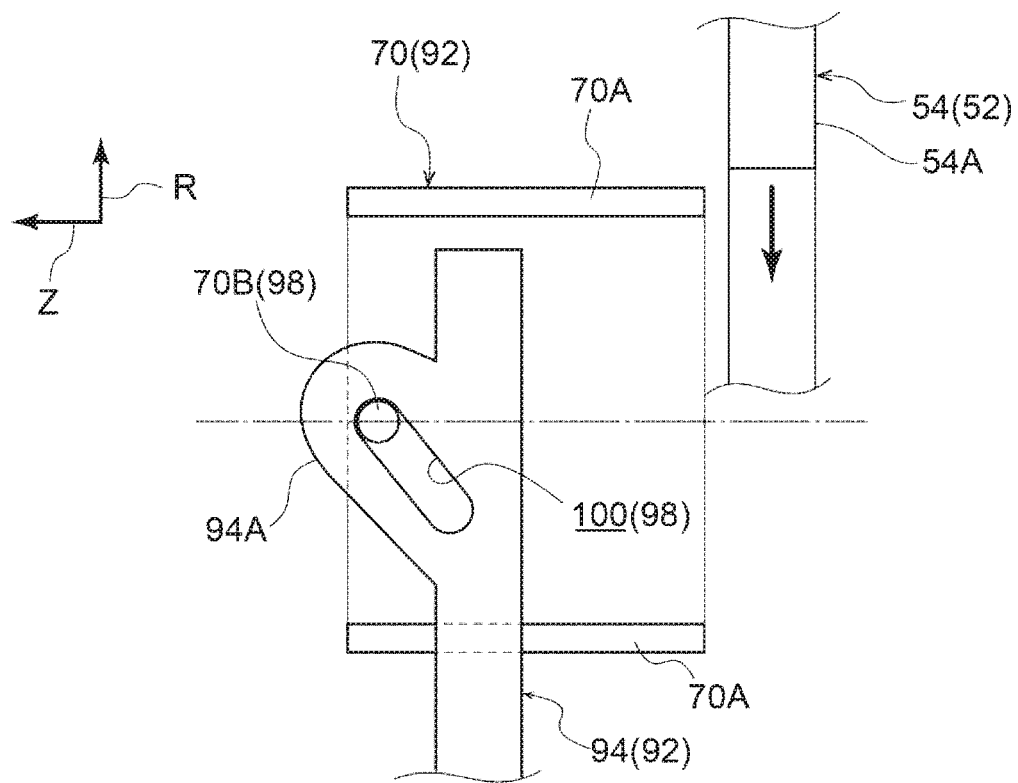
FIG. 8A is an enlarged side view illustrating a state of a locking inhibition mechanism illustrated in FIG. 6 before operation.

The allowable position illustrated in FIG. 8A is a position of the collar member 70 in a state before the locking inhibition mechanism 92 operates. In this state, the projection portion 70B of the collar member 70 penetrates through an upper part of the cam hole 100. Further, when the weight member 54A of the webbing sensor mechanism 52 rotates on its own axis in accordance with inertia force, the collar member 70 is placed at a position where the collar member 70 does not enter a rotation raceway of the weight member 54A.

Figure 8B:
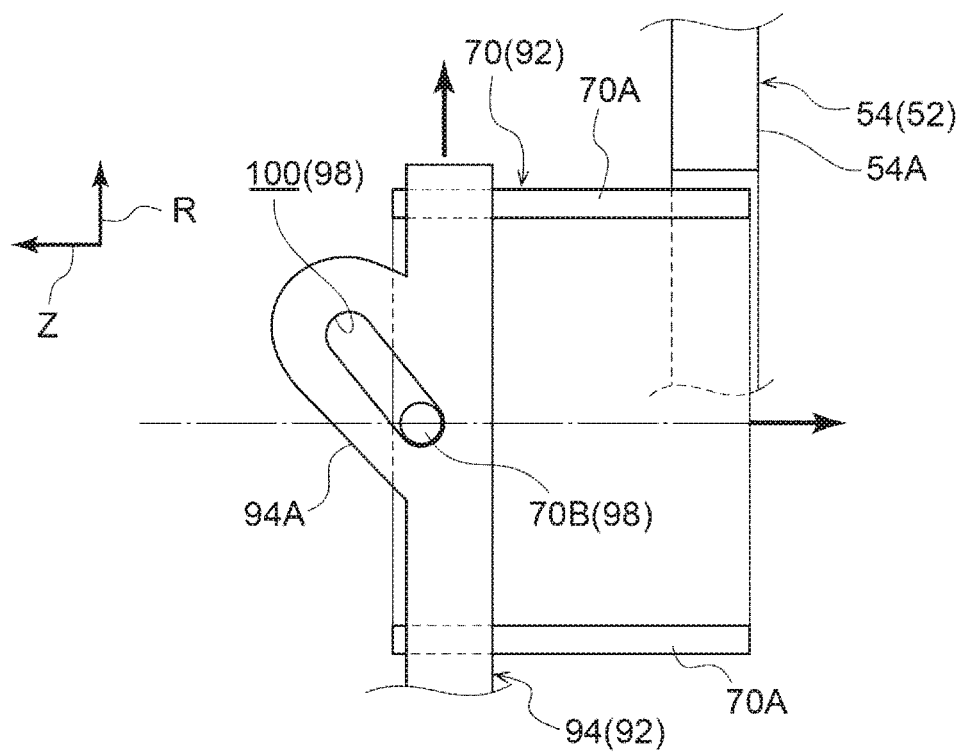
FIG. 8B is a view corresponding to FIG. 7 and illustrates a state of the locking inhibition mechanism after operation.

The restriction position illustrated in FIG. 8B is a position of the collar member 70 in a state after the locking inhibition mechanism 92 operates. In this state, the projection portion 70B of the collar member 70 penetrates through a lower part of the cam hole 100. Further, when the weight member 54A rotates on its own axis in accordance with inertia force, the collar member 70 is placed at a position where the collar member 70 enters the rotation raceway of the weight member 54A.

Further, as illustrated in FIG. 3, the control rod 94 is biased radially outwardly by a coiled spring 102 fixed to the lock panel 62. The coiled spring 102 is placed with its axial direction being along the radial direction and is supported by supporting columns 104 provided in a standing manner on an outer peripheral surface of the support portion 68 and a branching-off point between the opposing walls 94A in the control rod 94, respectively. Note that a biasing force of the coiled spring 102 is equal to the magnitude of a biasing force given to the engageable portion 78 from the leaf spring 84, so that those biasing forces are balanced. When no current is applied to the coiled portion 82B, tilting of the support member 80 is restrained by the biasing forces of the leaf spring 84 and the coiled spring 102, so that the operations of the vehicle sensor mechanism 76 and the locking inhibition mechanism 92 are restrained.

In the above configuration, when a current is applied to the coiled portion 82B of the electromagnet 82 in a second direction opposite to the direction in the operation of the webbing sensor mechanism 52, a vehicle sensor operates. More specifically, when a current is applied to the coiled portion 82B in the second direction and a magnetic force attracting the permanent magnet 90 is generated in the core 82A, the locking-inhibition movable portion 80B of the support member 80 tilts toward the control rod 94 side as indicated by a continuous line in FIG. 7. Here, in the present embodiment, the output of the electromagnet 82 is set such that, when a current is applied to the coiled portion 82B in the second direction, the control rod 94 is displaced radially inwardly against the biasing force given from the coiled spring 102 so that the second displacement portion is displaced to the restriction position. Hereby, rotation of the weight member 54A is inhibited by the collar member 70, thereby making it possible to inhibit the webbing pawl 54B of the engagingly locking portion 54 from being engagingly locked by the engagingly locked portion 56. The operation of the webbing sensor mechanism 52 is inhibited as such, so that rotation of the spool 28 in the drawing direction is not locked.

As illustrated in FIG. 3, operations of the vehicle sensor mechanism 76 and the locking inhibition mechanism 92 as described above are controlled by the ECU 108 electrically connected to the coiled portion 82B. A sensor portion 110 including various sensor devices provided in the vehicle is electrically connected to the ECU 108, and current application to the coiled portion 82B in the first direction or the second direction is performed based on information detected by the sensor portion. Note that the ECU 108 corresponds to a controlling portion in the present disclosure.

The sensor portion 110 includes a well-known buckle switch sensor (a first detection portion) and can detect whether an engaged state where the tongue 18 is engaged with the buckle 20 is established or not.

Further, the sensor portion 110 includes a well-known acceleration sensor (a second detection portion) and can detect whether an acceleration-deceleration speed or vehicle angle of a predetermined value or more at the time of a vehicle collision or the like is detected or not.

Further, the sensor portion 110 includes a well-known webbing sensor and can detect whether the webbing 14 is drawn from the spool with a drawing amount larger than a predetermined amount or not.

Further, the sensor portion 110 includes a well-known spool sensor (a third detection portion), and when the spool 28 rotates in the drawing direction, the sensor portion 110 can detect whether the spool 28 rotates at an angular acceleration larger than a predetermined angular acceleration or not.

Control by ECU 108

In the present embodiment, when the ECU 108 determines, based on information from the sensor portion 110, that the engaged state where the tongue 18 is engaged with the buckle 20 is not established, the ECU 108 performs a control such that a current is applied to the coiled portion 82B in the second direction, so that the locking inhibition mechanism 92 is operated. This can restrain rotation of the spool 28 from being locked unnecessarily in a case where the spool 28 is suddenly rotated because the occupant P is to wear the webbing 14 hastily.

In the meantime, when the ECU 108 determines, based on the information from the sensor portion 110, that the engaged state where the tongue 18 is engaged with the buckle 20 is established, the ECU 108 performs a control such that no current is applied to the coiled portion 82B. When the ECU 108 determines, based on the information from the sensor portion 110, that the vehicle is in emergency during traveling of the vehicle, the ECU 108 performs a control such that a current is applied to the coiled portion 82B in the first direction, so that the vehicle sensor mechanism 76 is operated. Hereby, rotation of the spool 28 in the drawing direction is locked, so that the body of the occupant P is restricted by the webbing 14.

Note that the ECU 108 determines that the vehicle is in emergency, in a case where the ECU 108 detects, based on the acceleration sensor included in the sensor portion 110, the acceleration-deceleration speed or vehicle angle of the predetermined value or more at the time of a vehicle collision or the like. Further, the ECU 108 determines that the vehicle is in emergency, in a case where the ECU 108 detects, based on the webbing sensor, that the webbing 14 is drawn from the spool with a drawing amount larger than the predetermined amount.

Further, under a situation in which the ECU 108 determines, based on the information from the sensor portion 110, that the engaged state where the tongue 18 is engaged with the buckle 20 is established and that the vehicle is not in emergency, when the ECU 108 determines that the spool 28 rotates at an angular acceleration larger than the predetermined angular acceleration, the ECU 108 performs a control such that a current is applied to the coiled portion 82B in the second direction, so that the locking inhibition mechanism 92 is operated.

Hereby, even in a case where the webbing 14 is suddenly drawn because the occupant P suddenly changes a sitting posture or the like in a state where the occupant P wears the webbing 14, it is possible to restrain rotation of the spool 28 from being locked unnecessarily.

Operations and Effects

Next will be described operations and effects of the present embodiment.

As illustrated in FIG. 1, in the vehicle seatbelt device 10 of the present embodiment, the webbing 14 is drawn from the spool 28, so that the occupant P wears the webbing 14. Further, the vehicle seatbelt device 10 includes the webbing sensor mechanism 52 configured to operate when the spool 28 is rotated in the drawing direction at an angular acceleration larger than the predetermined angular acceleration. In the webbing sensor mechanism 52, when the spool 28 is rotated in the drawing direction at an angular acceleration larger than the predetermined angular acceleration, the engagingly locking portion 54 is displaced radially outward while the engagingly locking portion 54 is rotating relative to the ratchet wheel 40 in accordance with inertia force. Hereby, the engagingly locking portion 54 is engagingly locked by the engagingly locked portion 56, so that rotation of the spool 28 in the drawing direction is restricted. As such, in a case where the webbing 14 is suddenly drawn from the spool 28 in emergency of the vehicle, that is, in a case where the spool 28 is rotated in the drawing direction at an angular acceleration larger than the predetermined angular acceleration, for example, rotation of the spool 28 in the drawing direction is locked, so that drawing of the webbing 14 from the spool 28 is restricted. As a result, it is possible to restrict the body of the occupant P.

In the meantime, in some cases, when rotation of the spool 28 in the drawing direction is locked under a situation in which it is not necessary to restrict drawing of the webbing 14, a wearing operation of the webbing 14 may be restricted, or the body of the occupant P may be restricted unnecessarily. On this account, unnecessary locking of rotation of the spool 28 may be restrained.

Here, in the present embodiment, the locking-inhibition movable portion 80B of the locking inhibition mechanism 92 is moved so as to inhibit unnecessary locking of rotation of the spool 28. The locking-inhibition movable portion 80B is moved by current application to the coiled portion 82B. When the locking-inhibition movable portion 80B is moved, the control rod 94 is displaced along the radial direction, the control rod 94 being placed outward of the engagingly locking portion 54 in the axial direction of the spool 28. Further, along with the displacement of the control rod 94, the collar member 70 is displaced axially from the allowable position to the restriction position. When the collar member 70 is displaced to the restriction position, the collar member 70 enters the rotation raceway on which the engagingly locking portion 54 rotates relative to the ratchet wheel 40, so that displacement of the engagingly locking portion 54 toward the outer side in the radial direction is restricted. This restricts the engagingly locking portion 54 from being engagingly locked by the engagingly locked portion 56, thereby inhibiting locking of rotation of the spool 28 in the drawing direction. As such, when the locking-inhibition movable portion 80B is moved under a situation in which it is not necessary to restrict drawing of the webbing 14, for example, it is possible to restrain unnecessary locking of rotation of the spool 28.

Further, in the above configuration, restriction and release of displacement of the engagingly locking portion 54 are performed by displacement of the collar member 70 along the axial direction. The displacement of the collar member 70 is performed via the control rod 94 displaced along the radial direction of the spool 28. On this account, it is possible to restrain upsizing of the whole device in the axial direction of the spool 28 in comparison with a configuration in which restriction and release of displacement of the engagingly locking portion are performed by providing a plurality of members having a motion range in the axial direction of the spool.

Further, in the present embodiment, rotation of the spool 28 in the drawing direction is locked by moving the locking movable portion 80A of the vehicle sensor mechanism 76 in case of emergency of the vehicle. The locking movable portion 80A moves when a current is applied to the coiled portion 82B. When the locking movable portion 80A is operated, the engageable portion 78 is displaced radially inwardly and engaged with the engaged portion 50 provided in the ratchet wheel 40. Hereby, rotation of the spool 28 in the drawing direction is locked. By electrically receiving information from a sensor device configured to detect emergency of the vehicle as such, rotation of the spool 28 in the drawing direction can be locked by moving the locking movable portion 80A. In the meantime, even in a case where the locking movable portion 80A is not moved due to occurrence of a defect or the like in an electric system in case of emergency of the vehicle, the spool 28 is rotated in the drawing direction at an angular acceleration larger than the predetermined angular acceleration, so that the rotation of the spool 28 is locked. Hereby, emergency safe performance is improved.

Further, in the present embodiment, the locking movable portion 80A and the locking-inhibition movable portion 80B are provided in the support member 80 including the permanent magnet 90, the support member 80 being tiltable around the support shaft 86 extending along the axial direction of the spool 28. A first side of the support member 80 relative to the support shaft 86 serves as the locking movable portion 80A, and a second side of the support member 80 relative to the support shaft 86 serves as the locking-inhibition movable portion 80B. Further, the electromagnet 82 including the core 82A and the coiled portion 82B is placed to face the permanent magnet 90 of the support member 80. When a current is applied to the coiled portion 82B in the first direction, the support member 80 is tilted by a magnetic force, so that the locking movable portion 80A moves. In the meantime, when a current is applied to the coiled portion 82B in the second direction, the support member 80 is tilted by a magnetic force, so that the locking-inhibition movable portion 80B moves. Thus, the locking movable portion 80A and the locking-inhibition movable portion 80B can be provided in a single support member 80. Hereby, in comparison with a configuration where respective actuators configured to move the locking-inhibition movable portion and the locking movable portion are provided separately, the vehicle seatbelt device 10 can be constituted by a small number of members, thereby making it possible to restrain upsizing of the whole device. Further, it is possible to restrain consumption of electric power along with current application to the coiled portion 82B.

Further, in the present embodiment, biasing forces of the leaf spring 84 and the coiled spring 102 are given to the support member 80 via the engageable portion 78 and the control rod 94. In a state where no current is applied to the coiled portion 82B, tilting of the support member 80 is restricted by those biasing forces. Hereby, movement of the locking movable portion 80A and the locking-inhibition movable portion 80B can be restricted in a state where no current is applied to the coiled portion 82B. This makes it possible to restrain malfunction of the vehicle seatbelt device 10.

Further, in the present embodiment, the first end of the control rod 94 in the longitudinal direction is provided with the opposing walls 94A placed to face the collar member 70, and the cam holes 100 are formed in the opposing walls 94A. The collar member 70 includes the projection portions 70B penetrating through the cam holes 100, and when the projection portions 70B slide along the cam holes 100 along with displacement of the control rod 94, the collar member 70 is displaced in the axial direction of the spool 28. Thus, with a simple configuration, the collar member 70 can be displaced, and unnecessary locking of rotation of the spool 28 can be restrained.

Further, in a case where the tongue 18 is not engaged with the buckle 20, the ECU 108 of the present embodiment performs a control such that the locking-inhibition movable portion 80B is moved. Hereby, in a case where the webbing 14 is suddenly drawn from the spool 28 because the occupant P is to wear the webbing 14 hastily, that is, in a case where the spool 28 is rotated in the drawing direction at an angular acceleration larger than the predetermined angular acceleration under a situation in which it is not necessary to restrict drawing of the webbing 14, it is possible to restrain unnecessary locking of rotation of the spool 28.

Further, in a case where the spool 28 is rotated in the drawing direction at an angular acceleration larger than the predetermined angular acceleration in a state where the tongue 18 is engaged with the buckle 20 under a situation in which the vehicle is not in emergency, the ECU 108 of the present embodiment performs a control such that the locking-inhibition movable portion 80B is moved.

Hereby, it is possible to restrain unnecessary locking of rotation of the spool 28 under a situation in which it is not necessary to restrict drawing of the webbing 14, e.g., in a case where the spool 28 is rotated in the drawing direction at an angular acceleration larger than the predetermined angular acceleration because the occupant P wearing the webbing 14 suddenly changes a posture in a normal time.

Supplementary Description

In the above embodiment, the locking movable portion 80A and the locking-inhibition movable portion 80B are moved by use of the single support member 80 and the electromagnet 82 so as to displace the engageable portion 78 and the control rod 94. However, the present disclosure is not limited to this. The engageable portion 78 and the control rod 94 may be displaced by providing different actuators using an electromagnet or the like for the engageable portion 78 and the control rod 94.

Further, in the above embodiment, the retractor 16 of the vehicle seatbelt device 10 includes the vehicle sensor mechanism 76. However, the present disclosure is not limited to this, and the retractor 16 may not include the vehicle sensor mechanism 76.

Further, in the above embodiment, when the lock panel 62 is rotated by a predetermined angle in the drawing direction of the spool 28, the locking mechanism 34 operates, so that rotation of the spool 28 in the drawing direction is locked. However, the present disclosure is not limited to this. For example, the locking mechanism 34 may not be provided, and a lock panel doubling as a locking mechanism may be provided. In this case, the lock panel 62 is fixed to the frame 26 of the retractor 16 so as to rotatably support the ratchet wheel 40. When the engagingly locking portion 54 of the ratchet wheel 40 is engagingly locked by the engagingly locked portion 56, or when the engaged portion 50 is engaged with the engageable portion 78, rotation of the spool 28 is locked.

Further, in the present embodiment, it is determinable whether the vehicle is in emergency or not, based on information from the sensor portion 110 including the acceleration sensor and the webbing sensor. However, the present disclosure is not limited to this. For example, an emergency of the vehicle may be determined based on information from an external sensor such as a camera configured to capture an image of a predetermined range around the vehicle, a millimeter wave radar configured to transmit an exploration wave to a predetermined range and receive a reflected wave, or a laser imaging detection and ranging (LIDAR) system configured to perform scanning on a predetermined range. An emergency of the vehicle may be determined based on information from an internal sensor configured to detect a traveling state, the internal sensor including a vehicle speed sensor, a yaw rate sensor, or the like.

What is claimed is:

1. A vehicle seatbelt device comprising:
a spool around which webbing to be put on an occupant is wound up, the spool being configured to rotate in a drawing direction when the webbing is drawn;
a rotary portion provided on a first side of the spool in an axial direction of the spool, the rotary portion being rotatable together with the spool in an integrated manner;
an engagingly locking portion supported by the rotary portion in a relatively rotatable manner, the engagingly locking portion being configured such that, in a case where the spool is rotated in the drawing direction at an angular acceleration larger than a predetermined angular acceleration, the engagingly locking portion rotates relative to the rotary portion by inertia force and is displaced outwardly in a radial direction of the spool;
an engagingly locked portion provided outward of the engagingly locking portion in the radial direction of the spool, the engagingly locked portion being configured to lock rotation of the spool in the drawing direction when the engagingly locking portion is engagingly locked by the engagingly locked portion;
a first displacement portion provided outward of the engagingly locking portion in the axial direction of the spool, the first displacement portion being supported by a locking-inhibition movable portion configured to be moved by current application, the first displacement portion being configured to be displaced along the radial direction of the spool along with the movement of the locking-inhibition movable portion; and
a second displacement portion configured to be displaced along the axial direction of the spool from an allowable position to a restriction position along with the displacement of the first displacement portion, the allowable position being a position at which the second displacement portion does not enter a rotation raceway on which the engagingly locking portion rotates relative to the rotary portion, the restriction position being a position at which the second displacement portion enters the rotation raceway so as to restrict the engagingly locking portion from being displaced outwardly in the radial direction of the spool.

2. The vehicle seatbelt device according to claim 1, further comprising:
an engaged portion provided in an outer end portion of the rotary portion in the radial direction of the spool; and
an engageable portion provided outward of the rotary portion in the radial direction of the spool, the engageable portion being supported by a locking movable portion configured to be moved by current application in case of emergency of a vehicle, the engageable portion being configured to lock rotation of the spool in the drawing direction such that the engageable portion is engaged with the engaged portion by being displaced inwardly in the radial direction of the spool along with movement of the locking movable portion.

3. The vehicle seatbelt device according to claim 2, further comprising:
a support member including a permanent magnet and configured to be tiltable around a support shaft extending along the axial direction of the spool, the support member being configured such that a first side of the support member relative to the support shaft serves as the locking movable portion, and a second side of the support member relative to the support shaft serves as the locking-inhibition movable portion; and
an electromagnet placed to face the permanent magnet, the electromagnet including a core formed by use of a magnetic material, and a coiled portion placed around the core, wherein:
when a current is applied to the coiled portion in a first direction, the support member tilts toward a first side due to a magnetic force caused between the permanent magnet and the electromagnet so that the locking movable portion is moved; and
when a current is applied to the coiled portion in a second direction opposite to the first direction, the support member tilts toward a second side due to a magnetic force caused between the permanent magnet and the electromagnet so that the locking-inhibition movable portion is moved.

4. The vehicle seatbelt device according to claim 3, wherein:
the first displacement portion is biased outwardly in the radial direction of the spool by a first biasing member;
the engageable portion is biased outwardly in the radial direction of the spool by a second biasing member; and
in a state where no current is applied to the coiled portion, the support member is restricted from tilting by biasing forces of the first biasing member and the second biasing member.

5. The vehicle seatbelt device according to claim 1, wherein:
the first displacement portion is formed in an elongated shape with a longitudinal direction being along the radial direction of the spool;
a first end of the first displacement portion in the longitudinal direction is supported by the locking-inhibition movable portion while a second end of the first displacement portion in the longitudinal direction includes opposing walls placed to face the second displacement portion;
the second displacement portion includes projection portions penetrating through cam holes formed in the opposing walls; and
when the projection portions slide along the cam holes along with displacement of the first displacement portion, the second displacement portion is displaceable along the axial direction of the spool.

6. The vehicle seatbelt device according to claim 1, further comprising:
a tongue passed through the webbing;
a buckle with which the tongue is engageable;
a first detection portion configured to detect whether an engaged state where the tongue is engaged with the buckle is established or not; and
a controlling portion configured to move the locking-inhibition movable portion by current application when the controlling portion determines that the engaged state is not established based on information from the first detection portion.

7. The vehicle seatbelt device according to claim 6, further comprising:
a second detection portion configured to detect whether a vehicle is in emergency or not; and
a third detection portion configured to detect whether or not the spool is rotated in the drawing direction at the angular acceleration larger than the predetermined angular acceleration, wherein
in a case where the controlling portion determines that the engaged state is established based on information from the first detection portion, the controlling portion determines that the vehicle is not in emergency based on information from the second detection portion, and the controlling portion determines that the spool is rotated in the drawing direction at the angular acceleration larger than the predetermined angular acceleration based on information from the third detection portion, the controlling portion moves the locking-inhibition movable portion by current application.

* * * * *